(12) United States Patent
Drews

(10) Patent No.: US 6,173,307 B1
(45) Date of Patent: *Jan. 9, 2001

(54) MULTIPLE-READER MULTIPLE-WRITER QUEUE FOR A COMPUTER SYSTEM

(75) Inventor: Paul Drews, Hillsboro, OR (US)

(73) Assignee: Intel Corporation, Santa Clara, CA (US)

(*) Notice: Under 35 U.S.C. 154(b), the term of this patent shall be extended for 0 days.

This patent is subject to a terminal disclaimer.

(21) Appl. No.: 09/138,037

(22) Filed: Aug. 20, 1998

(51) Int. Cl.[7] ............................................. G06F 9/00
(52) U.S. Cl. ............................. 709/102; 710/52; 710/53
(58) Field of Search ............................. 709/100, 102, 709/103, 104, 105, 108; 710/52, 53, 54, 55, 56, 57

(56) References Cited

U.S. PATENT DOCUMENTS

| | | | |
|---|---|---|---|
| 4,914,570 | 4/1990 | Peacock | 395/650 |
| 4,916,658 | 4/1990 | Lee et al. | 395/425 |
| 5,003,471 | 3/1991 | Gibson | 395/250 |
| 5,093,912 | 3/1992 | Dong et al. | 385/650 |
| 5,125,083 | 6/1992 | Fite et al. | 395/375 |
| 5,155,820 | 10/1992 | Gibson | 395/375 |
| 5,175,829 | 12/1992 | Stumpf et al. | 395/375 |
| 5,867,734 | * 2/1999 | Drews | 709/872 |
| 5,922,057 | * 7/1999 | Hoet | 710/52 |
| 5,925,099 | * 7/1999 | Futral et al. | 709/204 |

OTHER PUBLICATIONS

Giao N. Pham et al., "A High Throughput, Asynchronous, Dual Port FIFO Memory Implemented in ASIC Technology," 1989, pp. P3–1.1 to P3–1.4.

Ahmed E. Barbour et al., "A Parallel, High Speed Circular Queue Structure," 1990, pp. 1089–1092.

* cited by examiner

Primary Examiner—Majid Banankhah
(74) Attorney, Agent, or Firm—Blakely, Sokoloff, Taylor & Zafman LLP (57) ABSTRACT

The circular queue invention herein provides a mechanism and method for producers of fixed-size data items to deliver those items to consumers even under circumstances in which multiple producers and multiple consumers share the same queue. Any producer or consumer can be permitted to preempt any producer or consumer at any time without interfering with the correctness of the queue.

17 Claims, 9 Drawing Sheets

MULTIPLE-READER MULTIPLE-WRITER QUEUE FOR A COMPUTER SYSTEM

BACKGROUND OF THE INVENTION

1. Field of the Invention

The field of the invention relates to queuing systems in a computer system. Specifically, the present invention relates to multiple-reader multiple-writer queues.

2. Description of Related Art

The circular queue invention herein provides a mechanism and method for producers of fixed-size data items to deliver those items to consumers even under circumstances in which multiple producers and multiple consumers share the same queue. Any producer or consumer can be permitted to preempt any producer or consumer at any time without interfering with the correctness of the queue.

Current queue implementations suffer from one or more disadvantages that stem from the need to maintain consistency of the queue data structures in spite of that fact that multiple agents manipulate them:

1. Queue implementations based on linked lists invariably involve a "critical region" within which several links must be manipulated indivisibly with respect to one another.
2. Queue implementations based on simple circular buffers avoid these critical regions by limiting themselves to a single variable being manipulated exclusively by either a reader or a writer, not both, but as a result they become limited to a single producer and a single consumer.
3. Avoiding the limitations of (1) and (2) usually involves preventing other agents such as interrupt handlers or preemptively scheduled processes from preempting an agent while it is in a critical region. On most prior art processors, instructions used to enforce critical regions require an additional privilege level not usually available to user code.
4. Avoiding the privilege limitation of (3) involves a performance burden in the form of either a procedure call to an operating system function that enforces critical regions or fault-handling code that "traps" some privileged instructions and simulates them.
5. In some cases it is possible to use a "spin-lock" implementation of critical regions without special privilege or performance overhead by appropriate use of a (non-privileged) "indivisible test-and-set" instruction. The use of a "spin-lock" is well known in the art. However, these cases are limited to ones in which the competing agents are independently scheduled, e.g., running on different processors or in a preemptively scheduled multitasking environment.

Thus, a queue supporting multiple producers and multiple consumers is needed.

SUMMARY OF THE INVENTION

The circular queue invention herein provides a mechanism and method for producers of fixed-size data items to deliver those items to consumers even under circumstances in which multiple producers and multiple consumers share the same queue. Any producer or consumer can be permitted to preempt any producer or consumer at any time without interfering with the correctness of the queue.

The present invention disclosed herein avoids the limitations of the prior art. The invention supports multiple readers and multiple writers. Any reader can preempt any other reader or writer. Any writer can preempt any other writer or reader. The implementation uses a combination of indivisible test-and-set and indivisible exchange-add instructions to enforce consistency. With the indivisible exchange-add and indivisible test-and-set instructions available on most conventional processors, no privileged instructions are required, so there is no performance penalty due to operating system overhead. There are no "critical sections" outside of the inherent indivisibility of the "indivisible" instructions, so even in cases where a task running on a single processor is preempted by an interrupt handler that must manipulate the queue before it returns control, both preempted and preempting queue operations succeed and the queue integrity is preserved. Indivisibility is typically implemented at the memory bus arbitration level, so this invention is applicable to concurrent, multiple-processor, shared-memory systems as well as preemptive, single-processor systems.

DETAILED DESCRIPTION OF THE PREFERRED EMBODIMENT

The circular queue invention herein provides a mechanism and method for producers of fixed-size data items to deliver those items to consumers even under circumstances in which multiple producers and multiple consumers share the same queue. Any producer or consumer can be permitted to preempt any producer or consumer at any time without interfering with the correctness of the queue.

This queue implementation achieves high performance using a variation on a circular-buffer queue process that operates completely in "user" privilege, thus avoiding the overhead of procedure calls to an operating system. The data structures and the process used to manipulate them while maintaining consistency are described in the paragraphs below. The key parts of the invention are indicated in the disclosure to follow as they are presented.

Figure 1:
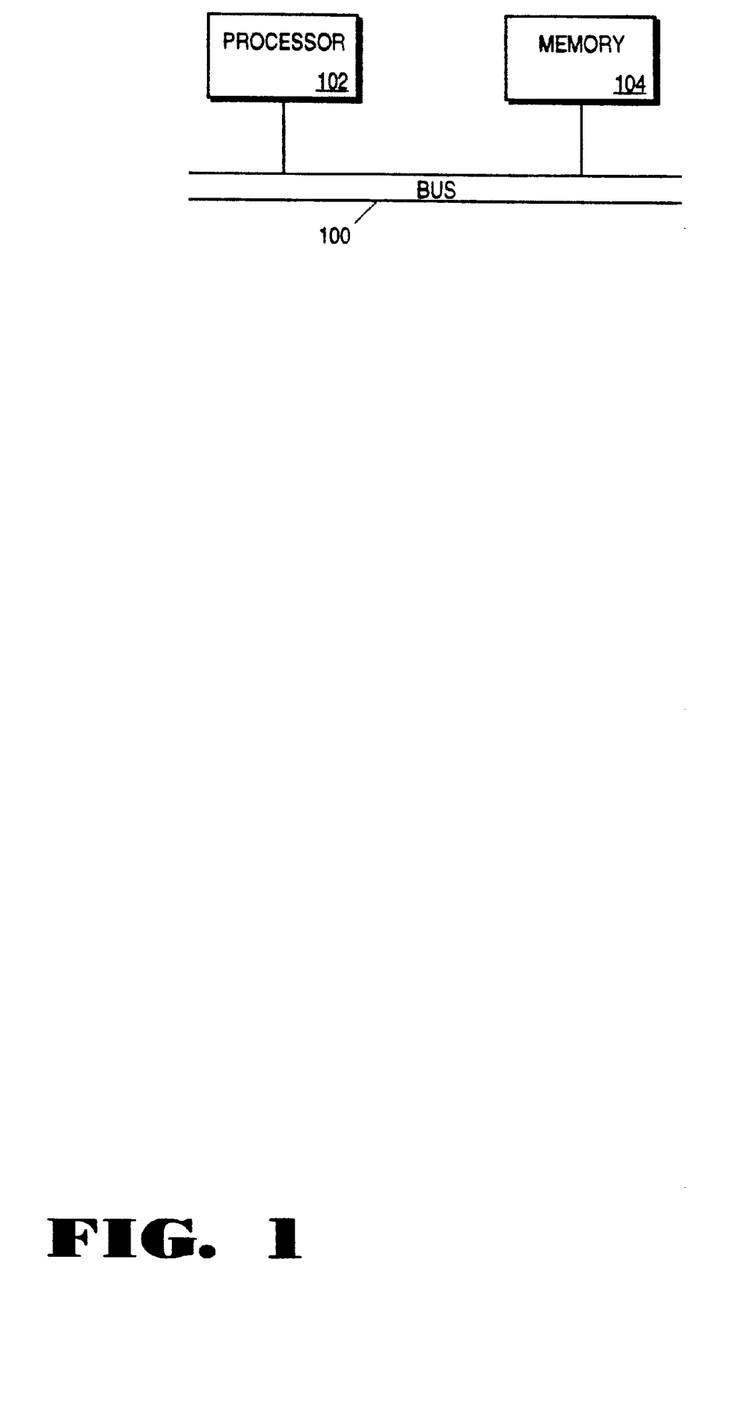
FIG. 1 illustrates a basic computer system in which the present invention operates.

Referring now to FIG. 1, a basic computer system in which the present invention operates is shown. The system comprises a bus 100 for communicating information, data, and instructions between a processor 102 and a memory subsystem 104. The processor 102 fetches instructions and data from memory 104 across bus 100, executes the instructions and typically stores resulting data back into memory 104. The basic system illustrated in FIG. 1 is well known in the art. The preferred embodiment of the present invention comprises instructions and data stored in memory 104 and executed and manipulated by processor 102.

Figure 2:
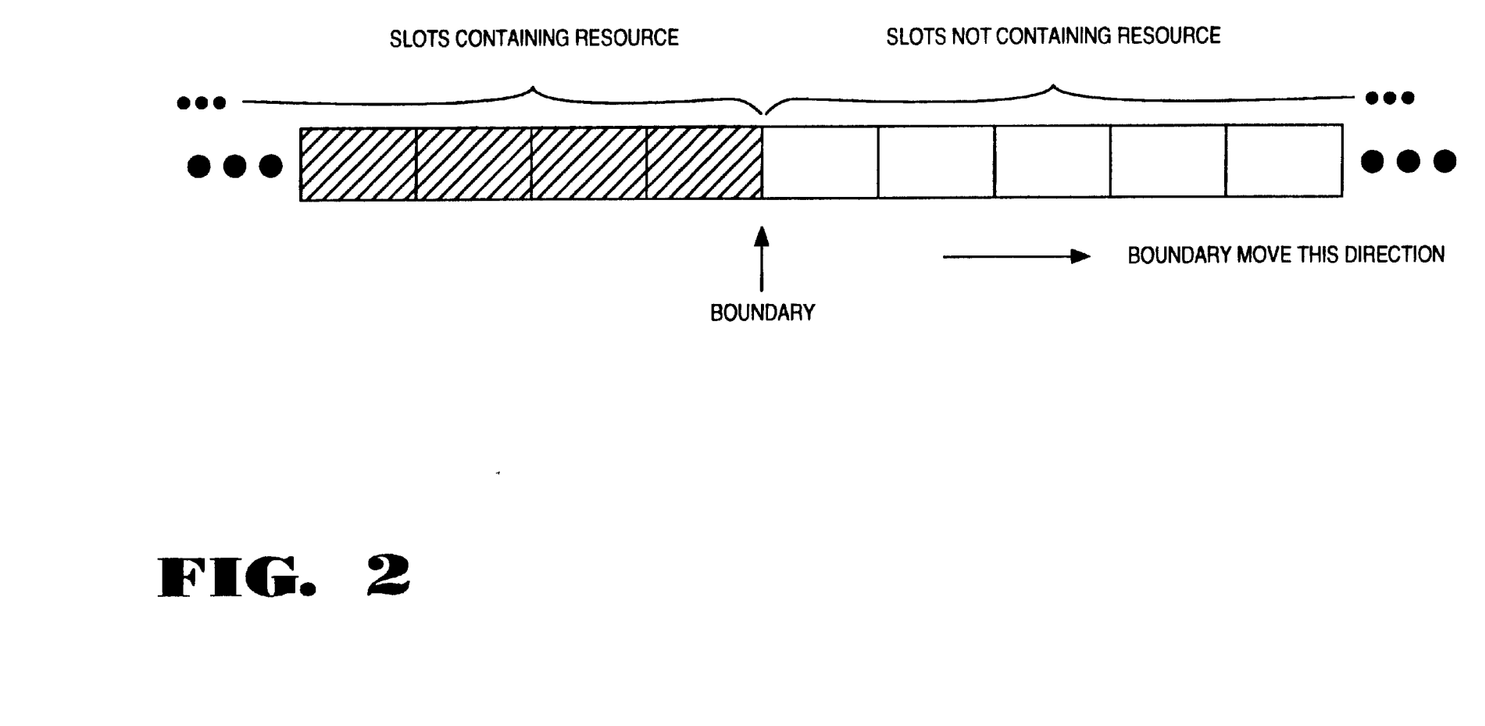
FIGS. 2–4 illustrate queue fragments showing the position of the markers and contents of the slots.
Figure 3:
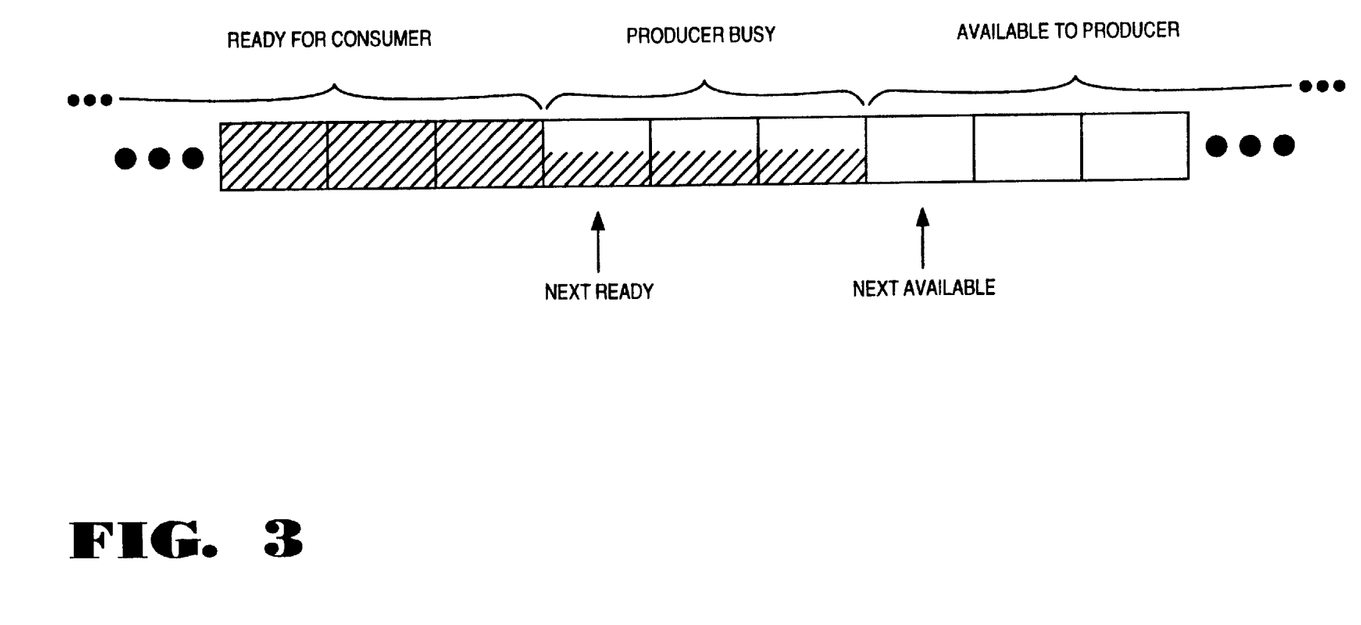
Figure 4:
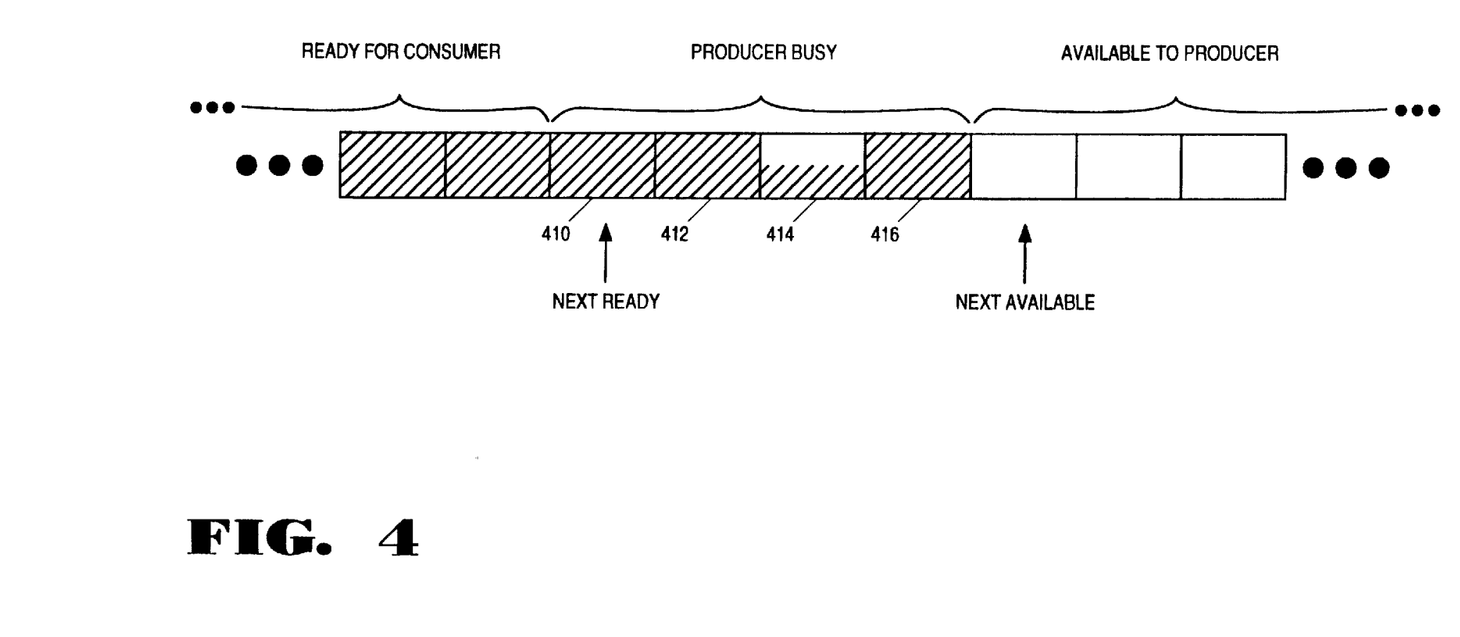

Referring now to FIGS. 2–4, fragments of the circular queue of the present invention are illustrated.

Manipulating a circular-buffer queue is a matter of adding a resource into a slot in the queue and moving a marker that indicates the boundary between the parts of the queue where resources are present and where they are not. The slots and markers are shown by example in FIG. 2. The matter of adding a resource can be applied both for "writing" and "reading" a queue. In the case of "writing", the resource added is a data item. In the case of "reading", the "resource"

that is "added" is a slot that has been emptied of a data item and is therefore newly available for writing. As a result, the processes for reading and writing are the same. Readers and writers simply give different names to resources and the same process they apply to those resources. Thus, the disclosure herein describes the process for reading from and writing to the queue in terms of a relationship between producer and consumer roles. The term "producer" can then denote "writer" while the term "consumer" denotes "reader" or vice versa depending on which half of the invention is being considered. A view of a producer of the present invention adding resources to the queue and moving a boundary marker is shown in the fragment of a queue illustrated in FIG. 2.

Referring to FIG. 2, the producer places resources (cross-hatches) into slots (rectangles) and advances the marker that indicates the boundary between the contiguous slots that do not contain the resource and those that do contain the resource. Once the marker has been moved, the resource becomes available to the consumer.

The first key to the present invention is splitting the addition of a resource into three phases: (1) acquiring a slot for a resource, (2) placing the resource in the slot, and (3) making the slot with the resource available to the consumer. Conventional circular queues use a single marker to indicate a boundary between slots not containing a resource and slots that do contain a resource. In contrast, this invention replaces the single boundary marker with two markers that divide the slots near the boundary into three sets. A "next-available" marker indicates the next slot available to the producer (but not yet acquired). A "next-ready" marker indicates the next slot to be made available to the consumer (but not yet made ready). Slots between these markers are "producer-busy" slots where producers are in the process of placing resources. This arrangement is shown in FIG. 3, in which producer-busy slots are shown partially cross-hatched. The two markers comprising the boundary are advanced in different phases as will be shown.

The processes of the present invention also maintain a count of the number of slots that are available to the producer. This is another key element of the invention. Conventional circular queues use a boundary marker not only to indicate the next slot available to the producer, but also as part of the indication of how many slots are available. In the present invention, these two functions are split between the "next-available" (to producer) marker and the "count" (of slots available to the producer). Producers examine the count to determine whether consumers have made one or more slots available. Thus the "count" (of slots available to the producer) communicates information from consumer to producer. Producers examine the "next-available" marker to acquire distinct slots in which to place resources.

Figure 5:
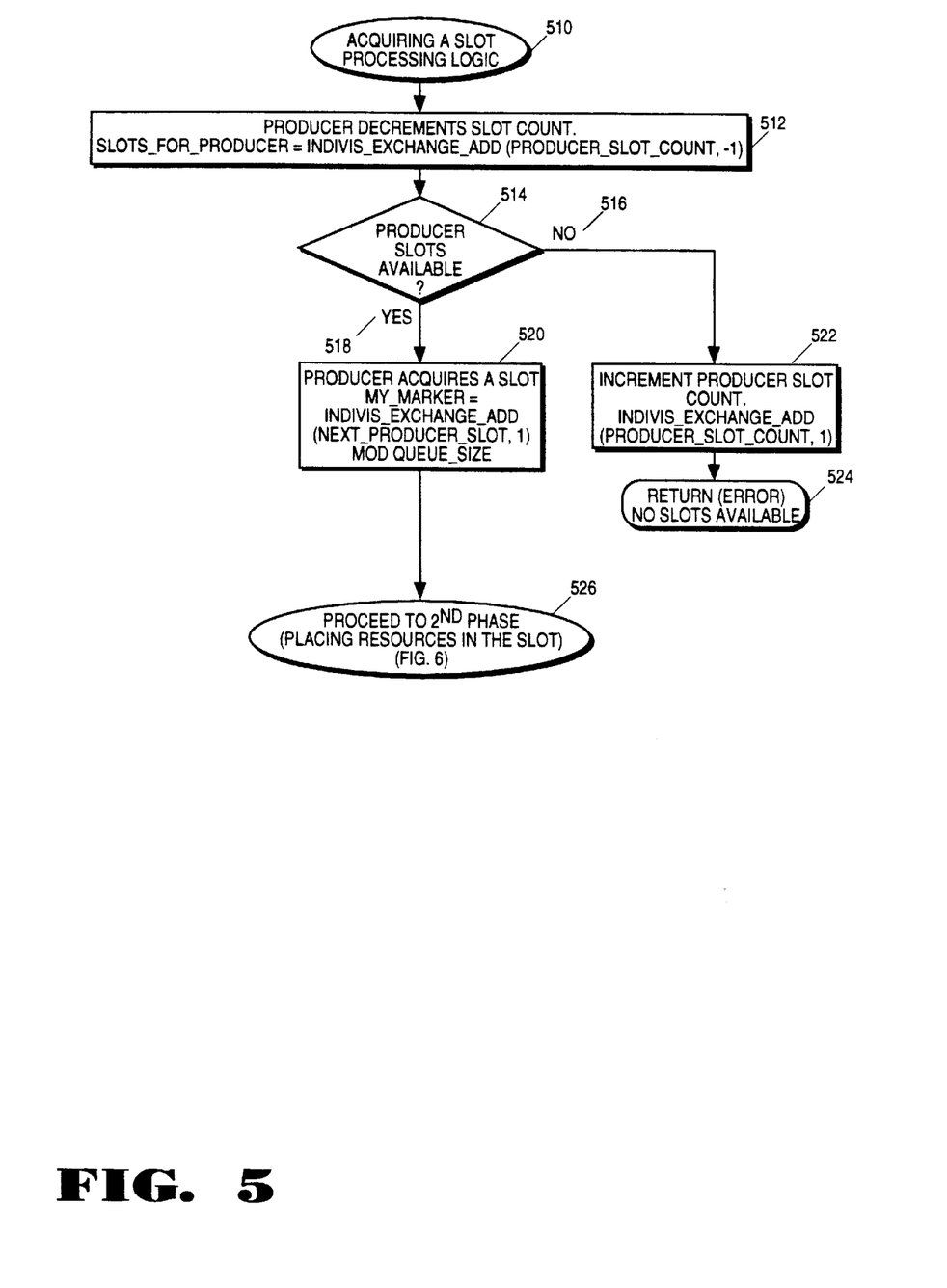
FIGS. 5–9 are flowcharts illustrating the processing logic of the present invention.
Figure 6:
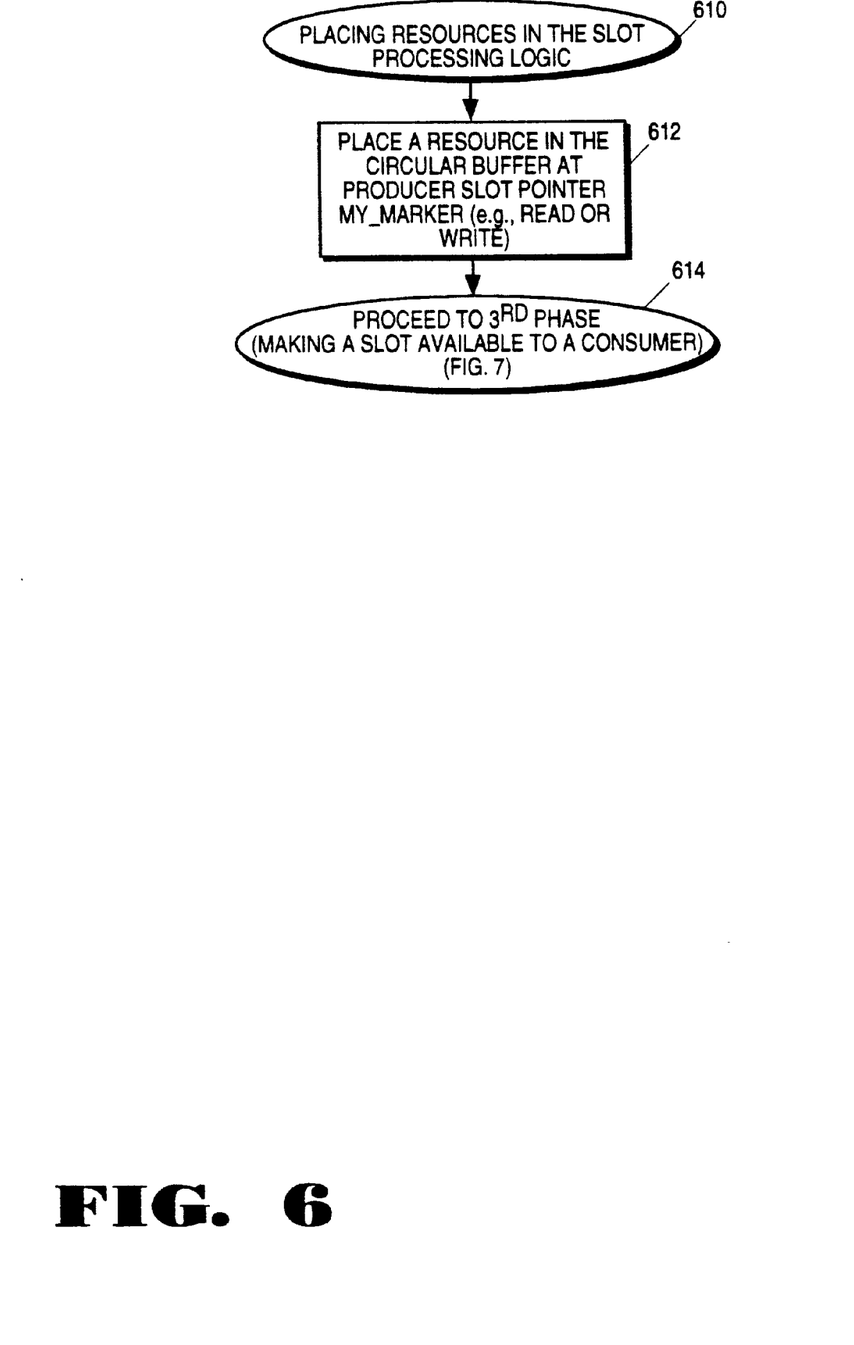

Referring now to FIG. 5, the processing logic for the first phase of the present invention for acquiring a slot (block 510) is illustrated. The indivisible exchange-add instruction is an essential part of the first phase (acquiring a slot). This instruction is used both to indivisibly decrement the count of available slots and to indivisibly increment the "next available slot" marker. In both of these cases, the instruction returns the old count or slot marker value as a side-effect. An indivisible exchange-add instruction and an indivisible test and set instruction is available in most conventional processor instruction repertoires. One example of a well known processor having such indivisible instructions is the 80486 brand microprocessor developed by Intel Corporation. The indivisibility of the instruction guarantees that no preempting agent can intercept and mistakenly use the same count or slot marker value. A producer indivisibly decrements the count (block 512) and examines the old value to determine if some slot is available (block 514). If not, it indivisibly increments the count again (block 522) and returns an error to the caller indicating that there was no room in the queue in which to place a resource (block 524). In this case the processing logic is completed. Otherwise, having determined that a slot is available (block 514), a producer indivisibly increments the next-available marker and examines the old value to acquire a distinct slot (block 520). The processing logic proceeds (block 526) to the next phase Referring now to FIG. 6, the processing logic for placing resources into queue slots (block 610) is illustrated. The second phase of the processing preferred by the present invention is placing the resource in the circular-buffer slot at the index indicated by the marker. If the producer is a "writer" it copies data from the caller's buffer into the circular buffer slot. If the producer is a "reader", it "produces" a newly emptied slot by copying data from the circular buffer slot to the caller's buffer (block 612). The processing logic proceeds (block 614) to the next phase.

Figure 7:
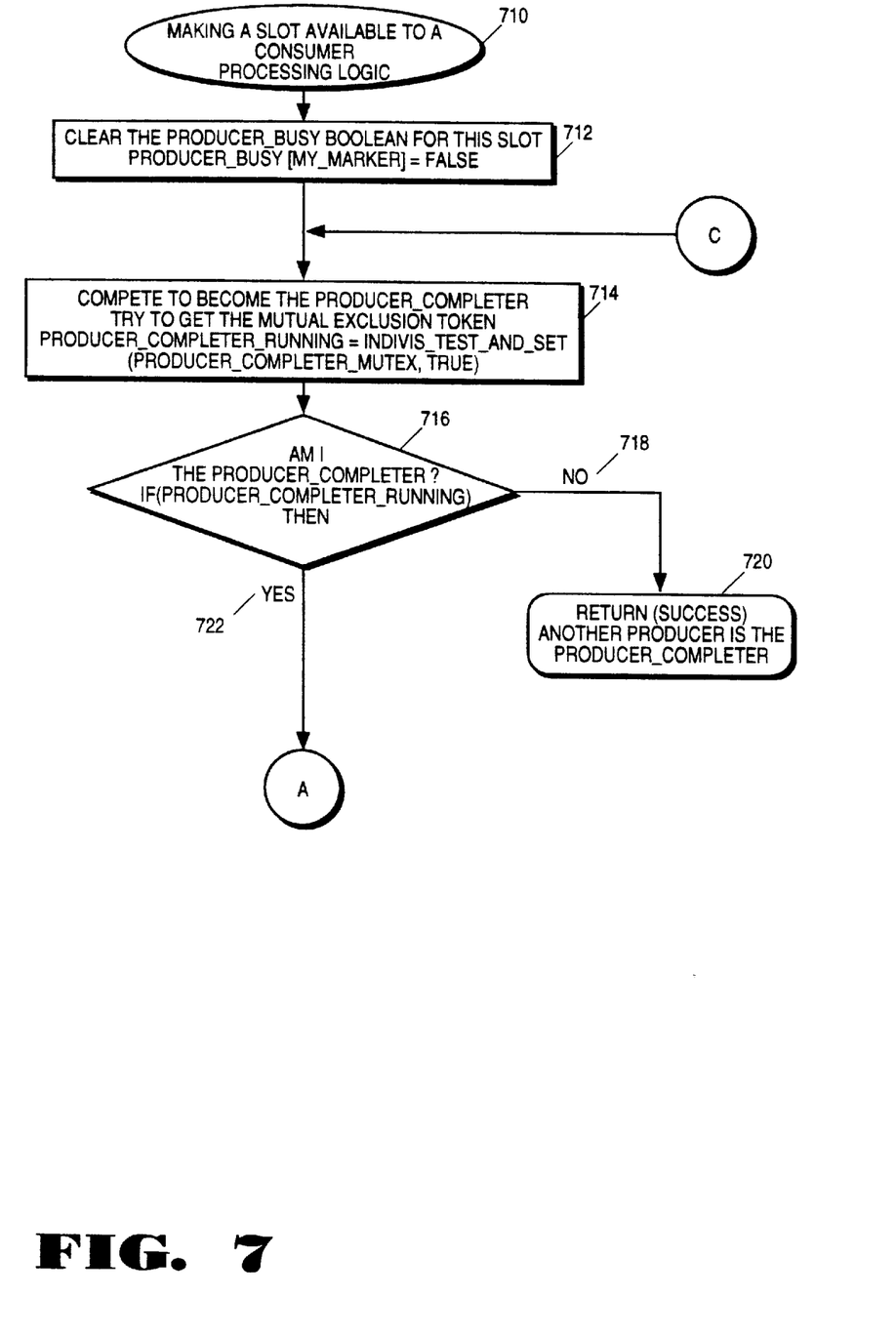
Figure 8:
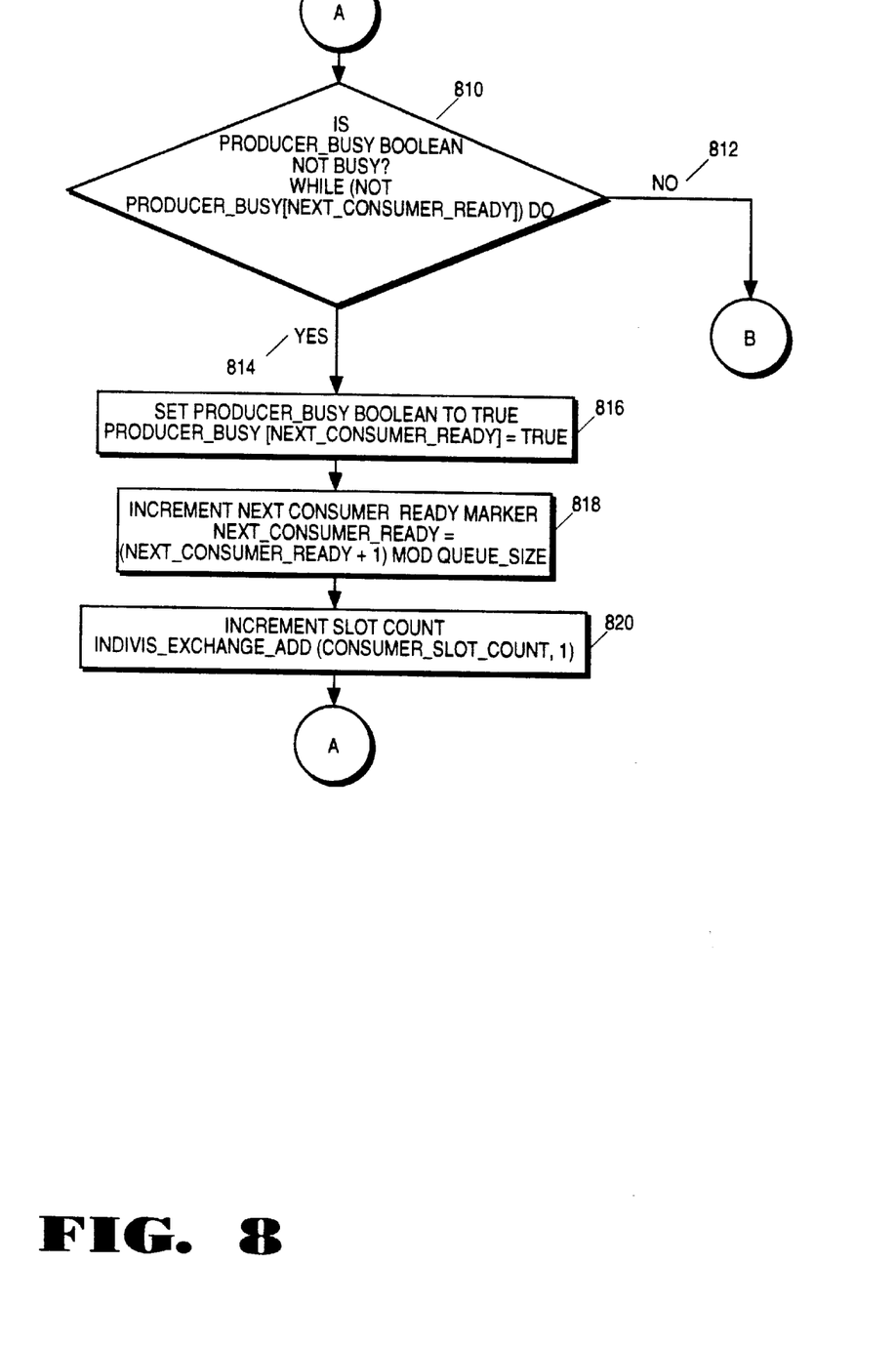
Figure 9:
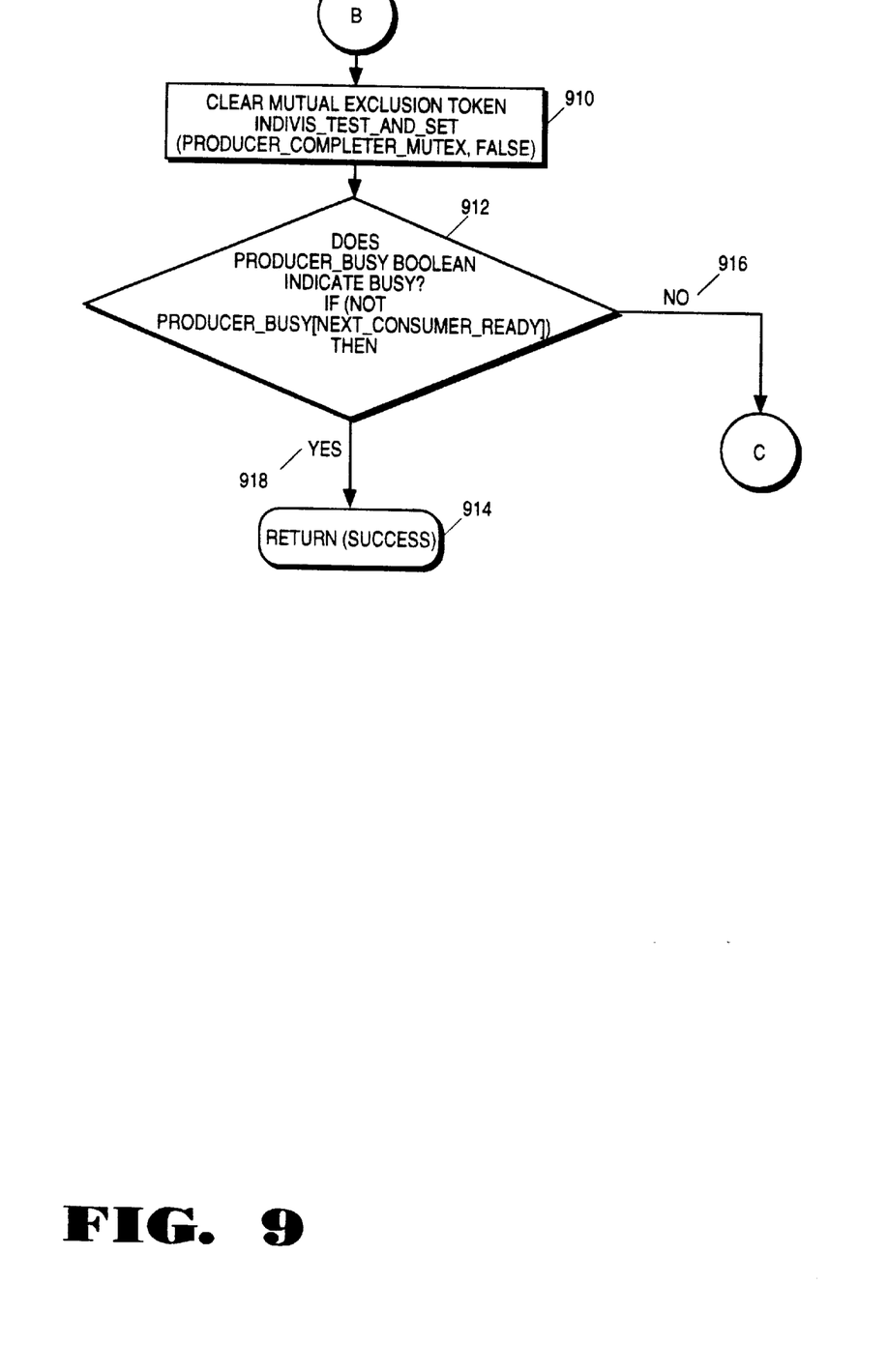

Referring now to FIGS. 7–9, the processing logic for making a slot available to the consumer (block 710) is illustrated. The third phase of the processing preferred by the present invention is making the slot with the resource available to the consumer. This part of the process guarantees that all "producer-busy" slots are eventually released to resource consumers, but that no such slots are released until the resource has been completely written. This step in the process uses two more key items of the present invention: 1) a mutual-exclusion token, and 2) an array of booleans corresponding to slots that indicate whether or not a producer is busy placing a resource in each slot. This is required due to the preemptive nature of systems for which this invention is targeted.

Consider a situation in which several producers have acquired slots before any of them has completed placing a resource in its slot. The order in which these producers finish placing their resources in their slots can be arbitrary. However, the order in which these resources may be consumed must be the order in which the slots themselves appear. Thus the "next-ready" marker must be only moved past contiguous ranges of slots where the states of "producer-busy" booleans indicate that resource placement has completed.

The normal state of a "producer-busy" boolean after initialization is "true". Thus, the moment a slot becomes "acquired", the slot is already flagged to indicate that a producer is in the process of placing a resource in the slot. When the producer finishes placing the resource, the producer marks its "producer-busy" boolean "false" (block 712). The producer must take care not to overwrite adjacent "producer-busy" booleans. For example it can avoid overwriting by representing these booleans as memory-granularity array elements or by using indivisible bit-manipulation instructions. An example of a queue fragment just after several producers have marked "producer-busy" booleans false is shown in FIG. 4. In FIG. 4, fully cross-hatched rectangles within the "producer-busy" section indicate slots where resource placement has completed.

In this example of FIG. 4, the two left-most slots 410 and 412 in the "producer-busy" section can be made ready for consumers. The next one 414 cannot, because it is still marked as busy. The rightmost slot 416 in the "producer-busy" section cannot be released even though its resource has been placed in the queue, because slot 416 has a "busy" slot somewhere before it. One additional key element of the present invention is the third phase process that updates the "producer-busy" booleans, the "next-ready" marker, and the count of slots available to the consumer, keeping them all consistent with one another.

Consistency is guaranteed by ensuring that one and only one producer updates these things. For brevity, the producer that does so may be called the "producer-completer". After a producer marks its "producer-busy" boolean to indicate that it has finished placing a resource in a slot (block 712 in FIG. 7), the producer "competes" to be the producer-completer (block 714). In the example above as illustrated in FIG. 4, the producers that just wrote the first 410, second 412, and fourth 416 slots from the left of the producer-busy section are the ones that compete as shown in FIG. 7.

The indivisible test-and-set instruction is used on the "producer-completer" mutual exclusion token to achieve this. The normal value of this token is "false". A producer uses indivisible test-and-set instruction to force the token to "true", also retrieving the old value as a side-effect. If the old value was "true" (block 716 in FIG. 7), then some other producer must have already acquired the token and no other action is required from this producer (processing path 718). A "success" indication is returned to the caller (block 720) and the processing logic is completed If the old value was "false" (block 716), then this producer is the "producer-completer" (path 722). The producer-completer examines the "producer-busy" booleans from the "next-ready" marker forward (block 810 shown in FIG. 8). As long as the producer completer finds a contiguous range of booleans marked to indicate that resource placement has completed (path 814), the producer-completer marks them one by one back to "true" (block 816), increments the "next-ready" marker (block 818), and indivisibly increments the count of slots available to consumers (block 820), stopping as soon as it encounters a slot marked as "still in-progress" (path 812). The producer-completer must use the indivisible exchange-add instruction to indivisibly increment the count of slots available to consumers (block 820) to ensure that its modification of the count does not violate the indivisibility of consumers' operations on the count. Indivisibly incrementing this count is the "other half" of communicating slot information from producer to consumer.

When the producer-completer examines a "producer-busy" boolean and finds that resource placement is still in progress for that slot (the third producer-busy slot 414 in FIG. 4), the producer-completer quits examining slots (path 812 in FIG. 8) and releases the producer-completer mutual exclusion token using the indivisible test-and-set instructions This step in the process is shown in block 910 of FIG. 9. It is possible, however, that the producer for that slot marked the slot after the producer-completer examined the slot (block 810 in FIG. 8) but before the producer-completer got a chance to release the token (block 910 in FIG. 9). In addition, that producer may have already examined the token, found it set, concluded that some other agent was already the producer-completer, and exited (714, 716, 718, 720 in FIG. 7). To cover such a case, after the producer-completer releases the mutual-exclusion token (block 910 in FIG. 9) the producer-completer checks the next "producer-busy" boolean once more (block 912). If the boolean has been marked to indicate that resource placement has completed for that slot (path 916), the producer goes back through the "producer-completer sequence again, starting with competing for the mutual exclusion token (block 714 in FIG. 7).

There is an important point related to "modulo" arithmetic that must be considered when implementing this process on many processors. The indivisible exchange-add instruction may have no provision for "modulo" arithmetic to cause the circular buffer marker to "wrap around". The modulo operation would be a separate instruction outside the scope of the indivisible operation. However, an indivisible exchange-add instruction usually "wraps-around" at its natural maximum, e.g., $2^n$ where n is the number of bits used for the circular buffer marker. This gives the required result as long as the implementer obeys two rules: (1) the circular buffer size must be chosen to be an integral divisor of the buffer marker maximum, and (2) the value used as the index into the circular buffer is adjusted to wrap around on the buffer size boundary (i.e., "BufferMarker modulo BufferSize"). In addition, the implementer must allow for negative "count" values and use signed comparisons on count values to cover cases where multiple producers compete for slots when they are not available.

In the pseudo-code listings that follow, the variables "slots_for_producer", "my_marker", and "producer_completer_running" are local variables. Each execution thread executing the algorithm gets its own distinct version of these variables. All other variables, and the circular buffer itself, are shared by all execution threads accessing the queue. Array indexes begin at zero. The pseudo-code of the "producer" process is shown. The "consumer" pseudo-code would be obtained by replacing each appearance of the string "producer" with "consumer" and each appearance of the string "consumer" with "producer".

The source code for implementing the preferred embodiment of the present invention is included below as appendix A.

```
// phase 1: acquire a slot
slots_for_producer = Indivis_Exchange_Add
(producer_slot_count, -1)
if (slots_for_producer <1) then
    Indivis_Exchange_Add(producer_slot_count, 1)
    return a "no slots available" error
endif
my_marker = Indivis_Exchange_Add
(next_producer_slot, 1) mod queue_size
//phase 2: place resource in slot
place resource in circular buffer at my_marker (e.g., read or write)
//phase 3: make slot with resource available to consumer
producer_busy[my_marker] = false
<<do_producer_completer>> // a label we will go back to
producer_complete_running = Indivis_Test_And_Set
    (producer_completer_mutex, true)
if (producer_completer_running) then
    return with "success" indication // another producer is the completer
endif
while (not producer_busy[next_consumer_ready]) do
    producer_busy[next_consumer_ready) = true
    next_consumer_ready = (next_consumer_ready + 1)
    mod queue_size
    Indivis_Exchange_Add(consumer_slot_count, 1)
end while
Indivis_Test_And_Set(producer_completer_mutex, false)
if (not producer_busy[next_consumer_ready]) then
    goto << do_producer_completer >>
endif
return with "success" indication
```

Pseudo-code of the "initialization" algorithm is as follows. This is done from the point of view that the queue is initially "empty" of the items that "producers" place in the queue.

```
// The "producer" side:
producer_slot_count = queue_size
next_producer_slot = 0
next_consumer_ready = 0
set all producer_busy = true
producer_completer_mutex = false
// The "consumer" side:
consumer_slot_count = 0
next_consumer_slot = 0
next_producer_ready = 0
set all consumer_busy = true
consumer_completer_mutex = false
```

This invention is useful in several broad classes of applications including, but not limited to, the following. First, it can be used wherever a thread of execution needs to pass information to another thread of execution with very low overhead. This situation arises in conventional operating systems, such as, Microsoft® Windows™, when one or more low-level drivers need to pass information to one or more higher-level applications. Such drivers typically operate in interrupt contexts. They may freely interrupt applications or one another. Algorithms must be low overhead to insure that interrupt processing is completed quickly. Interrupt contexts are also very restricted in what they are permitted to do, so avoiding operating system calls and limiting to "user" privilege are required.

Second, this invention can be used where there is a need to manage a fixed size "pool" of equivalent resources that are shared by a number of execution threads that have real-time, user-privilege requirements. An initialization step would "write" items into a queue to populate the pool. Thereafter, an agent would "read" from the queue to obtain a resource, and "write" to the queue to return the resource.

Thus, a multiple-reader multiple-writer queue is disclosed.

What is claimed is:

1. A system comprising:
   a queue, including:
   a plurality of regions of slots to contain resources, the plurality of regions of slots including a ready-for-consumer region having slots ready for reading resources, a producer-busy region having slots into which resources are being written, and an available-to-producer region having slots available for writing resources,
   a next-ready marker marking a next slot ready for reading resources and a boundary between the ready-for-consumer region and the producer-busy region,
   a next-available marker marking a next slot available for writing resources and a boundary between the producer-busy region and the available-to-producer region,
   a reading-available slot count indicating the number of slots ready for reading resources, and
   a writing-available slot count indicating the number of slots available for writing resources; and
   a processor coupled to the plurality of regions of slots, the processor executing a set of instructions to obtain an available slot for writing resources, place a resource into the available slot, and make the available slot ready for reading resources.

2. The system of claim 1, wherein the queue further includes a mutual-exclusion token to limit writing access to the available-to-producer region to one producer.

3. The system of claim 1, wherein the queue further includes a plurality of boolean values, wherein each of the boolean values corresponds to one slot to indicate whether the slot is busy.

4. The system of claim 1, wherein the set of instructions includes:
   an indivisible processor instruction to modify the writing-available slot count; and
   an indivisible processor instruction to modify the next-available marker.

5. The system of claim 1, wherein the set of instructions includes:
   an indivisible processor instruction to place a resource into an available slot for writing resources; and
   an indivisible processor instruction to modify the reading-available slot count.

6. A computer readable medium encoded with a multiple-reader, multiple-writer circular queue comprising:
   a ready-for-consumer region including slots ready for reading resources;
   a producer-busy region including slots into which resources are being written;
   an available-to-producer region including slots available for writing resources;
   a next-ready marker to mark a next slot ready for reading resources and a boundary between the ready-for-consumer region and the producer-busy region;
   a next-available marker to mark a next slot available for writing resources and a boundary between the producer-busy region and the available-to-producer region.

7. The queue of claim 6, further comprising:
   a reading-available slot count to indicate a number of slots ready for reading resources; and
   a writing-available slot count to indicate a number of slots available for writing resources.

8. The queue of claim 7, further comprising a processor coupled to the regions of slots and executing a set of indivisible processor instructions to obtain an available slot for writing resources by decrementing the writing-available slot count and incrementing the next-available marker, place a resource into the available slot, and make the available slot ready for reading resources by incrementing the reading-available slot count and the next-ready marker.

9. The queue of claim 6, further comprising a mutual-exclusion token to limit writing access to the available-to-producer region to one and only one producer.

10. The queue of claim 9, further comprising:
    a processor coupled to the regions and executing processor instructions to obtain an available slot for writing resources by incrementing the next-available marker, acquire the mutual-exclusion token for one and only one producer, place a resource into the available slot, make the available slot ready for reading resources by incrementing the next-ready marker, and release the mutual-exclusion token.

11. The queue of claim 6, further comprising a plurality of boolean values, wherein each of the boolean values corresponds to one slot to indicate whether the slot is busy.

12. A method for constructing a queue comprising:
    providing a computer readable medium upon which said queue is encoded;
    providing a next-ready marker to mark a next slot in a first region having slots ready for reading, the marking being performed by a next-ready marker;

providing a next-available marker to mark a next slot in a second region having slots available for writing; and counting the number of slots in the first region by maintaining a reading-available slot count; and acquiring an available slot for writing by decrementing the writing-available slot count and incrementing the next-available marker.

13. The method for constructing the queue of claim 12, further comprises providing a mutual-exclusion token to limit access to the second region to one and only one producer.

14. The method for constructing the queue of claim 13, further comprises acquiring the mutual-exclusion token prior to placing the resource into the available slot, and releasing the mutual-exclusion token after placing the resource into the available slot.

15. The method for constructing the queue of claim 12 further comprising:

counting the number of slots in the second region by maintaining a writing-available slot count.

16. The method of claim 15 further comprising:

placing a resource into the available slot; and making the available slot ready for reading by incrementing the reading-available slot count and incrementing the next-ready marker.

17. The method for constructing the queue of claim 12, wherein the queue is a circular queue.

* * * * *